(12) United States Patent
Balachandran et al.

(10) Patent No.: US 8,812,673 B2
(45) Date of Patent: *Aug. 19, 2014

(54) CONTENT RATE CONTROL FOR STREAMING MEDIA SERVERS

(75) Inventors: Krishna Balachandran, Morganville, NJ (US); Doru Calin, Manalapan, NJ (US); Eunyoung Kim, Parlin, NJ (US); Kiran M. Rege, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2012 days.

This patent is subject to a terminal disclaimer.

(21) Appl. No.: 11/674,842

(22) Filed: Feb. 14, 2007

(65) Prior Publication Data

US 2008/0191816 A1  Aug. 14, 2008

(51) Int. Cl.
*G06F 15/173* (2006.01)
*G06F 15/16* (2006.01)

(52) U.S. Cl.
USPC .......................................... 709/226; 709/232

(58) Field of Classification Search
USPC ................................................ 709/226, 232
See application file for complete search history.

(56) References Cited

U.S. PATENT DOCUMENTS

| | | | | |
|---|---|---|---|---|
| 5,642,152 | A * | 6/1997 | Douceur et al. | 725/97 |
| 5,918,002 | A * | 6/1999 | Klemets et al. | 714/18 |
| 6,292,834 | B1 * | 9/2001 | Ravi et al. | 709/233 |
| 6,614,763 | B1 * | 9/2003 | Kikuchi et al. | 370/252 |
| 7,054,774 | B2 * | 5/2006 | Batterberry et al. | 702/79 |
| 7,522,071 | B2 * | 4/2009 | Caselli et al. | 341/50 |
| 2002/0049852 | A1 * | 4/2002 | Lee et al. | 709/231 |
| 2002/0090027 | A1 * | 7/2002 | Karczewicz et al. | 375/240.01 |
| 2003/0198184 | A1 | 10/2003 | Huang et al. | 370/231 |
| 2004/0098748 | A1 | 5/2004 | Bo et al. | 725/105 |
| 2004/0163084 | A1 * | 8/2004 | Devadas et al. | 718/103 |
| 2004/0240390 | A1 * | 12/2004 | Seckin | 370/252 |
| 2004/0267503 | A1 * | 12/2004 | Batterberry et al. | 702/188 |
| 2006/0109915 | A1 * | 5/2006 | Unger | 375/240.27 |
| 2006/0168295 | A1 * | 7/2006 | Batterberry et al. | 709/231 |
| 2007/0097985 | A1 * | 5/2007 | Lee | 370/395.21 |
| 2007/0211636 | A1 * | 9/2007 | Bellur et al. | 370/238 |
| 2009/0182848 | A1 * | 7/2009 | Brown et al. | 709/220 |

OTHER PUBLICATIONS

MathsRevision.net. "Standard Deviation." [Retreived online on Sep. 14, 2009] Jan. 11, 2005. [Retreived from the Internet] <URL: http://web.archive.org/web/20050111211045/http://www.mathsrevision.net/gcse/pages.php?page=42>.*

MathsRevision.net. "Standard Deviation." [Retreived online on Sep. 14, 2009] Jan, 11, 2005. [Retreived from the Internet] <URL: http://web.archive.org/web/20050111211045/http://www.mathsrevision.net/gcse/pages.php?page=42>.*

(Continued)

*Primary Examiner* — Larry Donaghue
(74) *Attorney, Agent, or Firm* — Davidson Sheehan LLP

(57) ABSTRACT

The present invention provides a method for content rate selection. The method includes selecting a content rate for play out of at least one frame transmitted from a media server to a media client via a wireless access network. Selection of the content rate is performed based on a statistical representation of a bandwidth available for transmission of frames.

16 Claims, 7 Drawing Sheets

(56) References Cited

OTHER PUBLICATIONS

Communication relating to the results of the International Search Report from counterpart International Application No. PCT/US2008/001390 dated Nov. 6, 2008.
Written Opinion.
3GPP TS 26.234 V6.5.0 (Sep. 2005) 3$^{rd}$ Generation Partnership Project; Technical Specification Group Services and System Aspects; Transparent end-to-end Packet-switched Streaming Service (PSS); Protocols and codecs (Release 6) Sep. 2005.
3GPP TR 26.937 V6.0.0 (Mar. 2004) 3$^{rd}$ Generation Partnership Project; Technical Specification Group Services and Systm Aspects; Transparent end-to-end packet switched streaming service (PSS); RTP usage model (Release 6) Mar. 2004.

* cited by examiner

CONTENT RATE CONTROL FOR STREAMING MEDIA SERVERS

This application is related to U.S. patent application Ser. Nos. 11/674,802 and 11/674,858 filed concurrently herewith and incorporated herein by reference in their entirety.

BACKGROUND OF THE INVENTION

1. Field of the Invention

This invention relates generally to communication systems, and, more particularly, to wireless communication systems.

2. Description of the Related Art

Streaming media services (e.g. music, video) over wireless communication networks have been gaining in popularity, and are likely to become commercially important to wireless service providers in the near future. A major impediment to their success is the often poor and/or unreliable audio or video quality associated with these services. Packets transmitted through the wireless communication network may be lost, delayed, or experience jitter. For example, signal strength fluctuations due to environmental changes and the need to share the wireless access medium among multiple users lead to significant fluctuations in the rate at which packets carrying a media stream are delivered to mobile units and/or the applications running on the mobile unit such as a media player. Packets may also be lost as they traverse the air interface from the media server to the client, which may cause interruptions in the media service and/or degraded quality of the media service. Conventional media sessions attempt to reduce the effects of lost packets, delayed packets, and/or jitter by buffering the received data stream.

FIG. 1 conceptually illustrates one exemplary embodiment of a conventional system 100 for streaming media over a wireless network. The radio links 102 between the base stations 107 and mobile clients 110 constitute the only wireless segment of the system 100. Although the system 100 as a whole comprises wired as well as wireless segments, it is conventionally referred to as a wireless network 100. A core network 105 lies between the Gateway GPRS Support Node (GGSN) 120 and the media server 115. The network segment between the GGSN 120 and the mobile client 110 (which typically includes GGSN 120 and mobile client 110) is conventionally referred to as the wireless access network 125. In the illustrated embodiment, the wireless access network 125 is based on the Universal Mobile Telecommunications System (UMTS) (3GPP) standard. However, the wireless access network 125 may also operate according to other wireless networking technologies and standards, e.g., cdma2000 High Rate Packet Data (HRPD) or IEEE 802.16e/WiMAX. In the case of cdma2000 HRPD, for instance, system 100 would appear identical to that in FIG. 1, except that the node pair, Serving GPRS Support Node (SGSN) 103 and Gateway GPRS Support Node (GGSN) 120, is replaced by a single entity known as the Packet Data Serving Node (PDSN). Furthermore, although a hierarchical architecture is illustrated, the wireless network 100 may also implement flat or distributed Internet Protocol (flat-IP) based architectures where Layer 3 routing (i.e., IP routing) and control functions relating to the wireless access network 125 are performed by a base station router that merges the base-station 107, radio network controller (RNC) 130, SGSN 103 and GGSN 120 into a single entity.

In the illustrated embodiment, a mobile client 110 may initiate a streaming video session with a media server 115 over the wireless network 100. For example, the client 110 may request a streaming video session by sending an RTSP message to the server 115. To initiate a media session, the mobile client 110 exchanges signaling messages with the media server 115 to establish a streaming media session and negotiate session parameters, e.g. the bit-rate at which the media is to be streamed. The mobile client 110 also exchanges lower-layer signaling messages with the RNC 130, the SGSN 103, and the GGSN 120 to establish a radio access bearer channel. The radio access bearer channels are typically configured to maintain desired Quality-of-Service (QoS) characteristics, e.g. if best-effort bearer service is deemed inadequate. Once the radio access bearer channel is established and the streaming media session is set up, the media server 115 transmits packets carrying the media to the mobile client 110, via the GGSN 120, the SGSN 103, the RNC 130, and the base station 107. The mobile client 110 sends periodic feedback messages along the reverse path from the base station 107 to the RNC 130, SGSN 103, GGSN 120, and media server 115. Owing to uplink bandwidth limitations in wireless access networks, the uplink feedback messages are transmitted relatively infrequently, e.g. once every 3-4 seconds.

Packets carrying the media and feedback messages transmitted by the mobile client 110 are carried transparently by the network elements. Thus, the signaling (in the form of feedback messages from the mobile client 110) that helps the media server 115 make control decisions (such as changing transmission rate or content rate) is essentially end-to-end, with no intervention by the network elements. For example, the media server 115 may be responsible for content rate control. Conventional media servers 115 perform content rate control by estimating buffer levels at the mobile client 110 based upon the number of packets transmitted by the media server 115 and an estimate of the play out time at the mobile client 110 that is determined using the end-to-end feedback from the mobile client 110. The media server 115 may also transmit some control/signaling messages to the mobile client 110 on a periodic basis. These messages, such as "server reports" are also carried transparently by the network elements. The media server's control decisions are therefore based on the rather infrequent feedback received from the mobile client 110, which does not have direct knowledge of the channel conditions. Consequently, the media server 115 cannot make timely decisions to avoid packet losses or prevent rebuffering events that are detrimental to the quality of the streaming media service.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for content rate selection. The method includes selecting a content rate for play out of at least one frame transmitted from a media server to a media client via a wireless access network. Selection of the content rate is performed based on a statistical representation of a bandwidth available for transmission of frames.

BRIEF DESCRIPTION OF THE DRAWINGS

The invention may be understood by reference to the following description taken in conjunction with the accompanying drawings, in which like reference numerals identify like elements, and in which.

Figure 1:
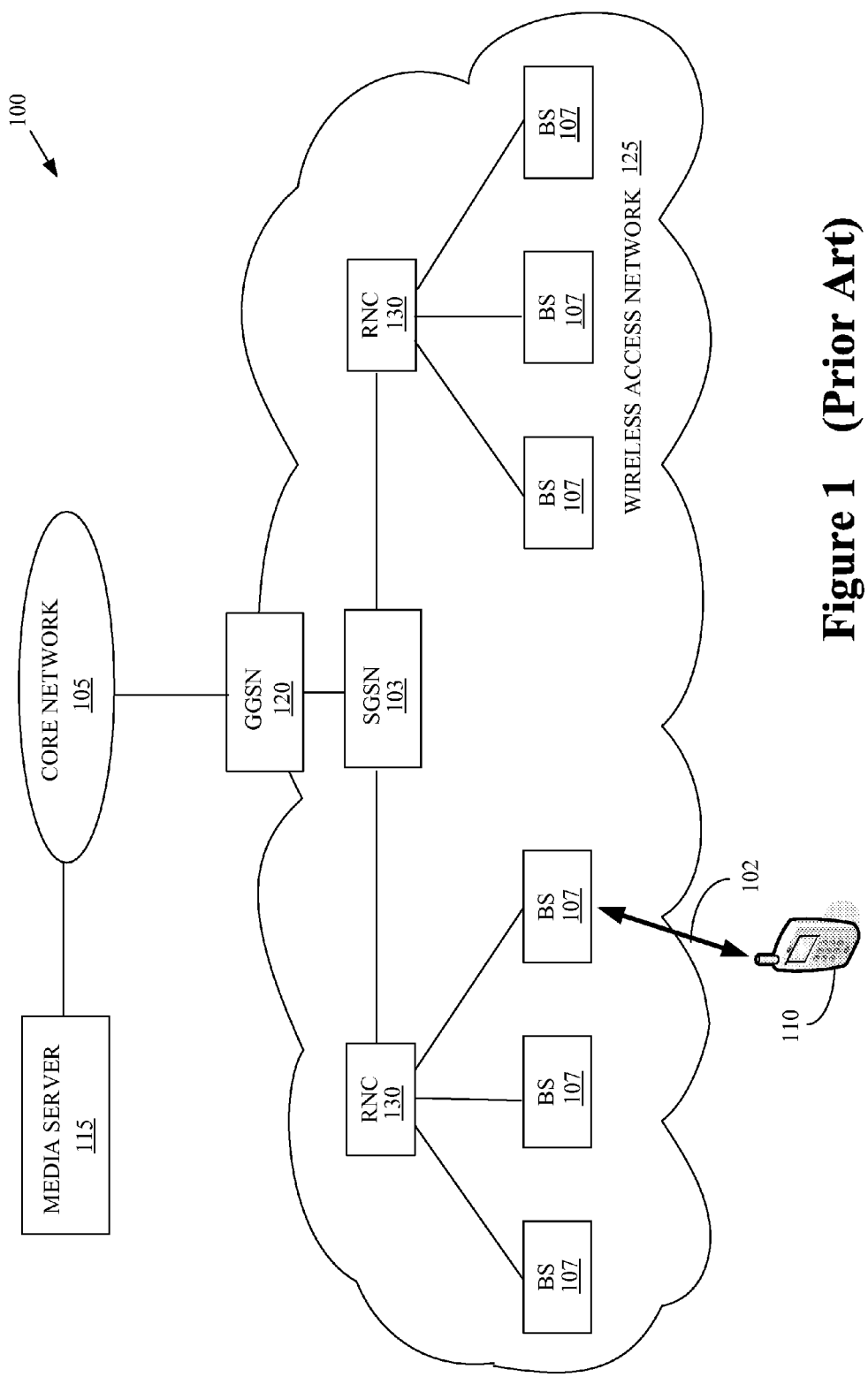
FIG. 1 conceptually illustrates one exemplary embodiment of a conventional system for streaming media over a wireless network.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
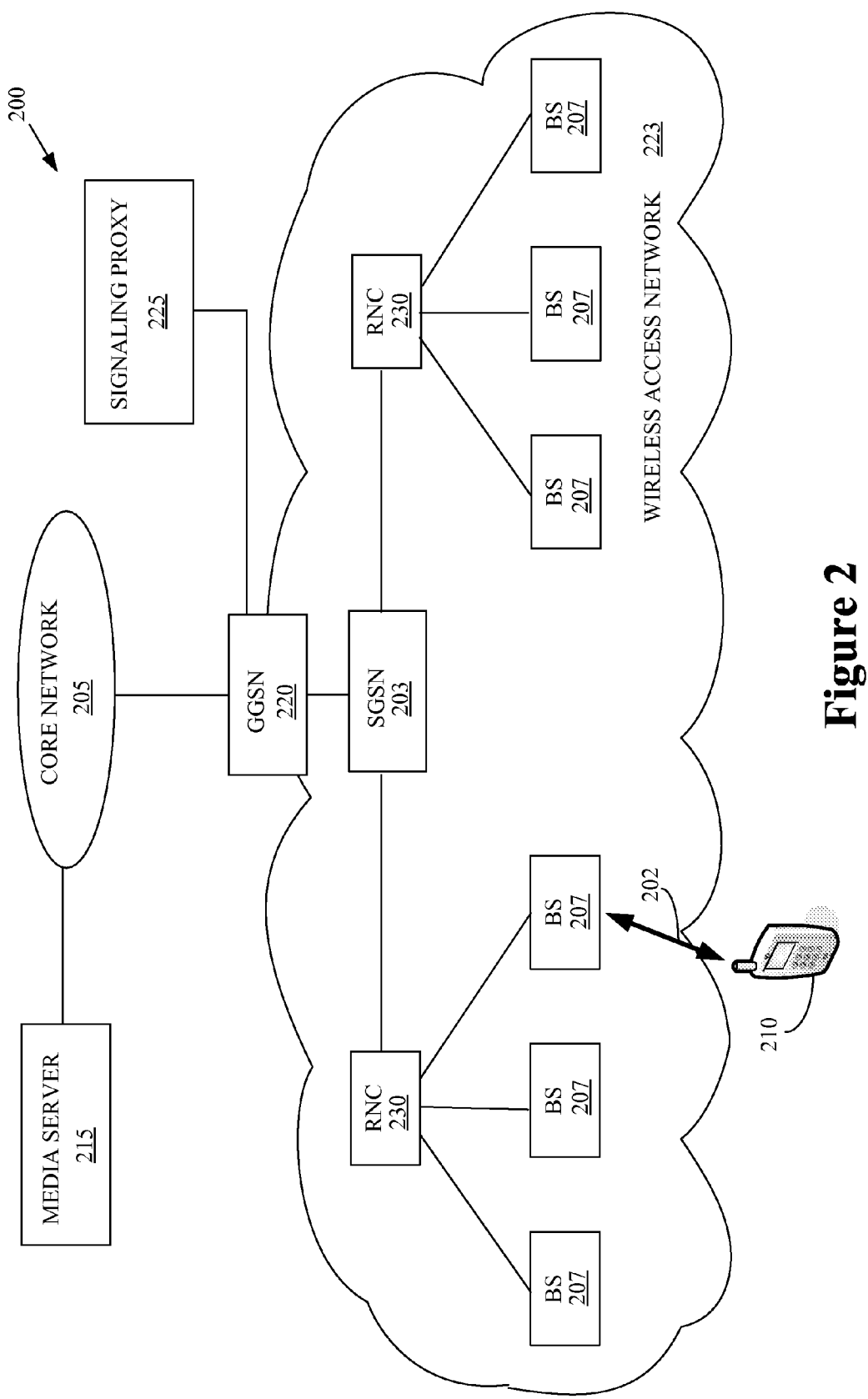
FIG. 2 conceptually illustrates one exemplary embodiment of a system for streaming media over a wireless network, in accordance with the present invention.

FIG. 2 conceptually illustrates one exemplary embodiment of a system 200 for streaming media over a wireless network 200. In the illustrated embodiment, the portion of the network 200 between the media server 215 and mobile client 210 is referred to as a wireless network 200 even though it may include wireless and wired segments. The network segment between GGSN 220 and mobile client 210 will be referred to as the wireless access network 223. In the illustrated embodiment, the wireless access network 223 includes one or more base stations 207 that may be used to stream media over an air interface 202 to one or more clients 210, such as mobile units. The media may be provided by a media server 215 via a Gateway GPRS Support Node (GGSN) 220, a Serving GPRS Support Node (SGSN) 203, and a radio network controller (RNC) 230. The core network 205, the base stations 207, the client 210, the media server 215, the SGSN 203, the GGSN 220, and the RNC 230 may operate according to the Universal Mobile Telecommunication System (UMTS) (3GPP) standards and/or protocols. For example, in streaming media sessions, the Real-time Transport Protocol (RTP) may be used to carry the media content and the associated Real Time Control Protocol (RTCP) may be used to carry the associated control packets. A third protocol, the Real Time Streaming Protocol (RTSP), may be used for the transmission of messages for session setup (including capability exchange), teardown, and some user actions (e.g. pause, fast-forward, etc.). Details regarding RTP/RTCP and RTSP can be found in the Internet Engineering Task Force Requests for Comments (IETF RFCs) 1889 and 2326, respectively.

However, persons of ordinary skill in the art having benefit of the present disclosure should appreciate that the first exemplary embodiment is intended to be illustrative and that the present invention is not limited to these standards and/or protocols. For example, the techniques described herein may also be applied to any other wireless networking technology and standards, e.g., cdma2000 High Rate Packet Data (HRPD) or IEEE 802.16e/WiMAX. In the case of cdma2000 HRPD, for instance, system 200 would appear identical to that in FIG. 2, except that the node pair, Serving GPRS Support Node (SGSN) 203 and the Gateway GPRS Support Node (GGSN) 220, would be replaced by a single entity known as the Packet Data Serving Node (PDSN). Furthermore, although a hierarchical architecture is illustrated, the techniques described herein may also be applied to flat-Internet Protocol (flat-IP) based architectures where Layer 3 routing (i.e., IP) and control functions relating to the wireless access network are performed by the base station.

The client 210 may support standard RTSP/RTCP signaling with or without 3GPP extensions for transparent end-to-end packet-switched streaming services. Thus, the client 210 may periodically send RTCP (feedback) packets towards the media server 215 to apprise the media server 215 of performance metrics such as: fraction of packets lost (since the last similar report), cumulative number of packets lost, highest (RTP) sequence number received, the extended highest sequence number associated with a received RTP packet, RTP timestamp associated with the last sender's report (received from the server), time since receiving the last sender's report, RTP sequence number associated with the next application data unit to be decoded, the delay until the decoding of the next application data unit (the "play out delay"), free buffer space (at the client), and the like. Note that the last three of this list of items are in accordance with the 3GPP extensions for packet-switched streaming services whereas the rest are standard feedback items included in RTCP receiver reports. Other than these items included in the receiver reports, each RTCP packet may also carry a timestamp that can be used by the server to relate the report to a specific point in time. The client 210 may send the RTCP feedback packets at a rate consistent with its own capability and the capacity of the wireless uplink. Typically, such feedback packets are sent rather infrequently, e.g. once every 3 to 4 seconds. The interval at which the client device sends its RTCP feedback will be denoted by $T_R$.

The wireless communication system 200 includes a signaling proxy 225. In one embodiment, the signaling proxy 225 may be attached to a wireless access network entity in the wireless network 200, such as the Gateway GPRS Support Node (GGSN) 220. However, in other embodiments of the invention it is possible to attach the signaling proxy 225 to other access network entities such as the Serving GPRS Support Node (SGSN) 203, the Radio Network Controller (RNC) 230, or, in the case of an access network comprising base-station routers that are characterized by a flat architecture (e.g. multiple functionalities handled by RNC, SGSN and GGSN collapsed into only one entity, the base-station router), to the base-stations themselves. The signaling proxy 225 may be implemented in software, firmware, hardware, or any combination thereof. Although the embodiments of the present invention described herein include the signaling proxy 225, persons of ordinary skill in the art should appreciate that the signaling proxy 225 is an optional element that is not necessary for the practice of the present invention.

The signaling proxy 225 receives feedback from the client 210. In one embodiment, the feedback from the client 210 is indicative of the current session state of the client 210. For example, the signaling proxy 225 may intervene in the flow of RTCP and RTSP messages and monitor the packet delivery count and the most recent highest RTP sequence number (e.g., as received from the client 210 in a receiver report) for each media stream. During session setup and teardown as well as during the lifetime of a session, control messages (e.g., RTCP and RTSP messages associated with the media session) generated by the client 210, which would normally go directly to the media server 215 are, instead, provided to the signaling proxy 225. These messages may help the signaling proxy 225 keep track of user actions as well as the state of the client 210 (e.g. buffer contents, expected time for overflow/underflow, etc.). In one embodiment, the RTP packets carrying the media content may flow directly from the media server 215 to the client 210.

The signaling proxy 225 also receives feedback from the wireless access network 223. In one embodiment, the feedback from the wireless access network 223 is indicative of resources associated with an air interface between the wireless access network 223 and the client 210. For example, the signaling proxy 225 may receive frequent feedback in the form of RAN-Proxy Control Packets from the sending Radio Link Control Protocol handler, which may be implemented without loss of generality at the Radio Network Controller 230. In the case of a wireless access network 223 with base-station routers, the signaling proxy 225 may be attached to these routers and the information concerning buffer levels, available bandwidth, number of competing users, etc. will be locally available. The feedback apprises the signaling proxy 225 of the detailed system information and system view available from entities in the wireless access network 223, such as buffer levels at the RNC 230, the number of users sharing the downlink bandwidth with the media session, the bandwidth available to each user or media stream, and the like. For each media stream, the channel/network condition feedback (sent by the corresponding RNC 230) may also include the maximum transmission rate at which the media stream can be transmitted under the current conditions. It is also possible to (optionally) report other measurements such as the number of packets carrying the streaming media delivered to the client 210 during the last reporting interval Information transmitted in the downlink signaling/control messages (e.g., the signaling/control messages transmitted by the media server 215) may be recorded at the signaling proxy 225 to keep track of the server actions and the capabilities negotiated between the client 210 and the server 215. In one embodiment, the signaling proxy 225 may pass these messages essentially unchanged to the client 210. Instead of being provided directly to the media server 215, uplink signaling/control messages transmitted by the client 210 may be diverted to the signaling proxy 225, which may record the information contained in these messages to keep track of the client state. The signaling proxy 225 may use this knowledge of the client state in combination with the periodic channel/network condition feedback received from the relevant network element to generate feedback messages, which may be sent to the media server 215. For example, the signaling proxy 225 may transmit feedback periodically, such as once every 100 ms.

The feedback messages formed by the signaling proxy 225 may include the information that was contained in the original feedback messages transmitted by the client 210 (and diverted to the proxy 225), as well as other useful parameters. For example, the feedback messages may include an estimate of the highest RTP sequence number delivered to the client 210, which may be generated by the proxy 225 based on the packet delivery count and the most recent highest RTP sequence number reported by the client 210, as will be discussed in detail below. The feedback messages may also include the maximum transmission rate for the streaming media session, which may be determined based on the actual network conditions that are visible to the corresponding network elements (such as the RNC 230). The bandwidth limitations between the signaling proxy 225 and the media server 215 do not typically constrain the frequency of feedback messages transmitted between the signaling proxy 225 and the media server 215, and so the signaling proxy 225 can send its feedback messages at fairly short intervals (e.g. 100 ms). The reduced feedback interval may help the media server 215 make more accurate and timely control decisions, relative to conventional systems that do not include a signaling proxy 225, thus enhancing the overall quality of the streaming media service.

The media server 215 can perform content rate selection. As used herein, the term "content rate" refers to the rate at which a media stream is played out at the client 210. The content rate corresponds to the average transmission rate needed to carry the corresponding media stream. A given content rate for a media can be realized by a combination of appropriate encoding and thinning. Typically, the higher the content rate, the better is the media quality as perceived by the end-user or client 210. In the case where the media is being streamed from some storage device, it can be encoded at different content rates and stored for future use. For a live streaming media session, the encoding may have to be done on the fly. When the media is being streamed, the server 215, based on the selected content rate, accesses the appropriate files containing media frames, packetizes these files, and then transmits them toward the client 210. In one embodiment, the media can be played out at any one of N content rates: $C_1$, $C_2, \ldots, C_N$, such that $C_1 < C_2 < \ldots < C_N$. Initially, the server 215 selects a content rate in accordance with the parameters negotiated with the client 210 during the session setup/capability exchange phase.

Once the capability exchange and session establishment is over, the media server 215 may start streaming media frames towards the client 210. The media server 215 may also start getting feedback messages from the signaling proxy 225. The client 210 buffers up the frames received from the server 215 until it has an adequate number of frames in its buffer (typically, equivalent to a playout time equal to what is commonly known as "pre-roll" period), and then starts playing them out in the proper sequence. The media server 215 may maintain estimates of the playout times of frames at the client 210. These estimates may be updated whenever the server 215 receives client feedback passed on to the server 215 by the signaling proxy 225. During the media streaming sessions, the major functions performed by the media server 215 may include content rate selection, transmission rate control and frame transmission scheduling. The media server 215 may also performs the subsidiary functions of handling feedback messages received from the proxy and maintaining "state variables" that enable the server 215 to perform its major functions, as will be discussed in detail below.

In the illustrated embodiment, the media server 215 may keep track of the byte count associated with the frames it has already transmitted and compute estimates of the mean and standard deviation of the frame-size (inclusive of packet overheads at the RTP level) at the highest content rate. Also, using the relevant information provided in the periodic reports received from the proxy 225, the media server 215 can maintain estimates of the mean and standard deviation of the channel bandwidth available to the media stream. For example, every $T_S$ seconds (e.g. every 3-4 seconds), the media server 215 may compute, for each possible encoding and/or content rate, an estimate of the probability of a rebuffering event happening within the next planning horizon of duration H seconds (e.g. next 3-4 seconds) if that content rate were to be used to encode the subsequent frames. The period for making rate-selection decisions, $T_S$, and the planning horizon, H, need not be equal. A conservative strategy could have H significantly larger than $T_S$.

This computation may be based on locally computed estimates of the mean and standard deviation of the frame-size as well as the most recent mean and standard deviation of the available channel bandwidth. Once these estimates are computed, the server 215 selects the highest content rate for which the probability of rebuffering within the next planning horizon is less than a certain threshold (e.g. 0.1%). The server 215 then outputs frames using this content rate until the end of the current $T_S$-second period, when it makes another rate-selection decision using the latest estimates of frame size and channel bandwidth parameters. The rate selection period, $T_S$, is a matter of design choice and, in some cases, may be determined by a compromise between the need to quickly react to changes in the channel characteristics and the need to avoid frequent rate changes, which are rather jarring to the end-user. In one embodiment, a value of 3-4 seconds is selected for the rate selection period, $T_S$.

Although selecting the content rate every $T_S$ seconds may avoid many potential rebuffering events, unexpected events may, at times, cause rebuffering to take place if the media server 215 were to perform content rate selection strictly according to the above logic. For example, sudden changes in channel characteristics may cause the buffer contents at the client 210 to fall to rather low levels, thereby increasing the likelihood of a rebuffering event in the near future. In one embodiment, the media server 215 may attempt to avoid such events by maintaining an estimate of the buffer level (in terms of the number of frames) at the client 210 using the feedback it receives from the proxy device 215. Whenever this estimate falls below a "low watermark" $\gamma_L$ (where $\gamma_L$ could be, for instance, 0.5 seconds worth of frames), the server 215 enters a "precautionary mode" and changes the content rate to the lowest possible content rate it is allowed to use. The media server 215 may perform this action regardless of the time left in the current rate selection period. Meanwhile, the transmission rate continues to be at the level set in accordance with the proxy feedback. The server 215 may stay in the precautionary mode until its estimate of the client buffer level rises above a "high watermark" $\gamma_H$, where $\gamma_H$ could be, for instance, 2 seconds worth of frames. At this point, the server 215 may leave the precautionary mode and resume the normal rate-selection procedure described above. As long as the server 215 is in the precautionary mode, the normal rate-selection procedure is turned off and the server 215 transmits frames at the lowest content rate.

In operation, the mobile client 210 may initiate a streaming video session with the media server 215 over the wireless network 200. For example, the client 210 may request a streaming video session by sending an RTSP message to the server 215. The GGSN 220 forwards the RTSP message to the signaling proxy 225 instead of the media server 215. The proxy 225 inspects this message, realizes that it could be the beginning of a new streaming video session, and makes an entry into its local cache. It then forwards the message to the server 215. The proxy 225 also sends a session establishment indication message to the RNC 230 through which the RTSP message passed on its way toward the GGSN 220. The session establishment indication message informs the RNC 230 of the impending establishment of the session. If a radio access bearer (RAB) has already been set up for the session, the RNC 230 responds (to the proxy 225) with a RAB establishment message; otherwise, the RNC 230 merely sends an acknowledgement.

The server 215 responds to the message, and a few more RTSP messages are subsequently exchanged by the client 210 and the server 215 to carry out a capability exchange. The subsequent RTSP messages are also routed via the signaling proxy 225. This enables the proxy 225 to discover the relevant capabilities indicated by one or more session parameters (e.g. bandwidth, buffer size, etc.) agreed upon by the client 210 and the server 215. If the capability exchange includes the rate or time interval at which the client 210 is to send its receiver report to the server 215, the proxy 225 modifies this parameter as it forwards the corresponding message to the server 215 so that the server 215 is prepared to receive feedback at the appropriate time interval or rate as determined by the proxy. In addition to regular reporting intervals, note that under certain conditions (e.g. changes in the session's maximum transmission rate or buffer status at the RNC 230), the proxy 225 may also choose to autonomously send feedback reports to the server 215. The modification enables the proxy 225 to send reports to the server 215 at a much higher rate (consistent with the abundant bandwidth available between the proxy 225 and the server 215) while allowing the client 210 to send its reports (which are intercepted by the proxy 225) at a lower rate.

After the capability exchange with the server 215, the client 210 initiates the establishment of a Packet Data Protocol (PDP) context and a Radio Access Bearer (RAB) to carry the streaming media session with the desired Quality of Service over the downlink. When the RAB and the corresponding Radio Bearer (RB) have been set up, the radio network controller (RNC) 230 informs the signaling proxy 225 about the event. If the proxy 225 already has an entry in its cache for a corresponding streaming video session, it responds with a positive indication, instructing the RNC 230 to send periodic feedback (to the proxy 225) about the session's available bandwidth, maximum transmission rate, IP packet delivery count (calculated as explained later), buffer occupancy and the like. At a minimum, this feedback should include the available bandwidth, maximum transmission rate and IP packet delivery count for the session; the other parameters are optional. If the proxy 225 does not have an entry in its cache for the streaming media session, it responds with a negative indication. Such a scenario could take place when a RAB is established to carry a streaming media session before the client 210 begins signaling with the media server 215 for session establishment. Note that in this scenario the proxy 225 may send a session establishment indication message to the RNC 230 when the signaling for session establishment is eventually undertaken with the transmission of the first RTSP message. The RNC 230 may then respond with another RAB establishment message since the RAB for that session has already been set up. The rest of the actions may then follow the sequence described herein.

From this point on, the RNC 230 may keep track of various parameters and/or calculate other parameters. In one embodiment, the RNC 230 keeps track of the number of IP packets belonging to the streaming media session that are delivered to the client 210. The RNC 230 also keeps track of the corresponding byte count, the number of IP packets that are discarded at the RNC for repeated block errors over the air interface, and the channel bandwidth that was available to the session (irrespective of whether it was used to carry packets belonging to it.) The RNC 230 processes this information at selected intervals, e.g., every $T_P$=0.100 seconds, to form information that may be sent in a channel/network condition feedback message to the signaling proxy 225. This feedback may include the channel bandwidth available to the session ($W_A$), the maximum transmission rate ($W_S$) (which is the maximum rate at which the media session can stream based on the current conditions), IP packet delivery count and, optionally, other relevant performance metrics such as the number of IP packets belonging to the session that are waiting in the RNC buffer, the corresponding byte count, and the like. For example, the RNC 230 may periodically report to the signaling proxy 225 the channel bandwidth available to the session, the maximum transmission rate the session can stream at, IP packet delivery count and, possibly, the amount of data stored in the buffer assigned for that session by the RNC 230 and/or other relevant parameters. It is also possible to set the maximum transmission rate for the session equal to the channel bandwidth available to it. In this case, the feedback would include only one of these two parameters.

In one embodiment, the IP packet delivery count, $N_T$, the available channel bandwidth, $W_A$, and the maximum transmission rate, $W_S$, may be computed as follows. Assuming that the streaming media session has a dedicated channel on the air interface, which would happen, for instance, if the air interface was based on the UMTS standard, the channel bandwidth available to the media session during the nth channel condition feedback interval, $W_A(n)$, can be estimated as follows: Let $N_D(n)$ and $N_L(n)$ respectively denote the number of IP packets delivered to the client 210 and the number of IP packets (belonging to that session) that were discarded due to repeated block errors during the $n^{th}$ channel condition feedback interval (of length $T_P$ seconds). Then, the (total) IP packet delivery count reported to the signaling proxy 225 at the end of this interval, $N_T(n)$, is given by $$N_T(n)=N_D(n)+N_L(n).$$

Furthermore, let $K_A(n)$ and $K_U(n)$ respectively denote the number of transmission opportunities that were available to the media session and the number of transmission opportunities that were actually used to carry data during the n-th interval. With a dedicated channel, a transmission block belonging to the dedicated channel could be looked upon as a transmission opportunity. Let $M_D(n)$ denote the byte count associated with the $N_D(n)$ packets that were actually delivered to the client 210 during this interval.

The available bandwidth, $W_A(n)$, is then given by:

$$W_A(n)=M_D(n)*K_A(n)/(K_U(n)*T_P) \text{ (in units of bytes per second).}$$

The maximum transmission rate for the nth channel/network condition feedback interval, $W_S(n)$, could be set equal to $W_A(n)$, the available bandwidth, or one may use the following heuristic:

$$W_S(n) = \alpha_L * W_A(n) \text{ if } Q(n) < \beta_L,$$
$$= \alpha_H * W_A(n) \text{ if } Q(n) > \beta_H,$$
$$= W_A(n) \text{ otherwise,}$$

where Q(n) is the amount of data belonging to the media session that is queued up in the RNC buffer at the end of the n-th channel/network condition feedback interval, $\beta_H$ is some "high watermark," $\beta_L$ is some "low watermark," with $\beta_H > \beta_L$, and $\alpha_L$ and $\alpha_H$ are constants with $\alpha_H$ less than 1 and $\alpha_L$ greater than 1. For instance, with a 20-Kbyte, per-session dedicated RNC buffer, $\beta_H$ and $\beta_L$ might be set equal to 10 Kbytes and 2 Kbytes, respectively, whereas $\alpha_H$ and $\alpha_L$ might be set equal to 0.5 and 1.5 respectively.

In some alternative embodiments, a shared channel may be used to deliver the media stream over the wireless segment. The concept of maximum transmission rate for the media stream can be exploited in these embodiments to maximize the streaming rate without running the risk of packet losses. However, the calculation of the maximum transmission rate for the media stream, as well as that of the channel bandwidth available to the media stream, is different in this case. With a shared channel wherein many different streams/sessions are statistically multiplexed over the same physical or MAC-layer channel. The maximum transmission rate for the media stream and the channel bandwidth available to it are, therefore, functions of the different streams sharing the channel, their respective priority levels, bandwidth guarantees, channel characteristics, the buffering strategy being used at the RNC, and the buffer levels at the RNC. The specific algorithm for the calculation of these quantities is a matter of design choice, although it may depend on the details of the transmission scheduling strategy being used at the base station. The RNC 230 may then inform (via the proxy 225) the media server 215 of the maximum transmission rate at which the media can be streamed (as well as the channel bandwidth available to it), thereby enabling service operators to flexibly share bandwidth resources among different users in accordance with their requirements and service guarantees. This capability may be particularly useful during periods of congestion.

The receiver reports transmitted by the client 210 may be carried in RTCP packets. The GGSN 220 forwards all RTCP packets received in the upstream direction to the signaling proxy 225. When the proxy 225 receives the first such packet for a given session (for which it has made an entry in its local cache), it may append to the packet additional information such as the maximum transmission rate and, possibly, a few of the other feedback parameters for the session that it has received from the RNC 230 or has calculated using the information it has received from the RNC 230, and forwards the packet toward the server 215. From this point on, the proxy 225 sends an RTCP feedback report to the server 215 at regular intervals. Recall that this interval is typically much shorter (e.g. in order of hundreds of milliseconds to allow both enough averaging and fast feedback—around 100 ms) than the interval at which the client 210 sends its RTCP reports. If the proxy 225 has received a client report (forwarded to it by the GGSN 220) since its last transmission of an RTCP report to the server 215, the proxy 225 may include the data reported by the client 210 as well as its own feedback (which has either been provided to it by the RNC 230 or calculated using the information provided by the RNC 230) in its next RTCP report to the server 215. Otherwise, the proxy 225 includes only its own feedback data (which has been received directly from the RNC 230 or calculated using the information received from the RNC 230) in its report to the server 215.

Figure 3:
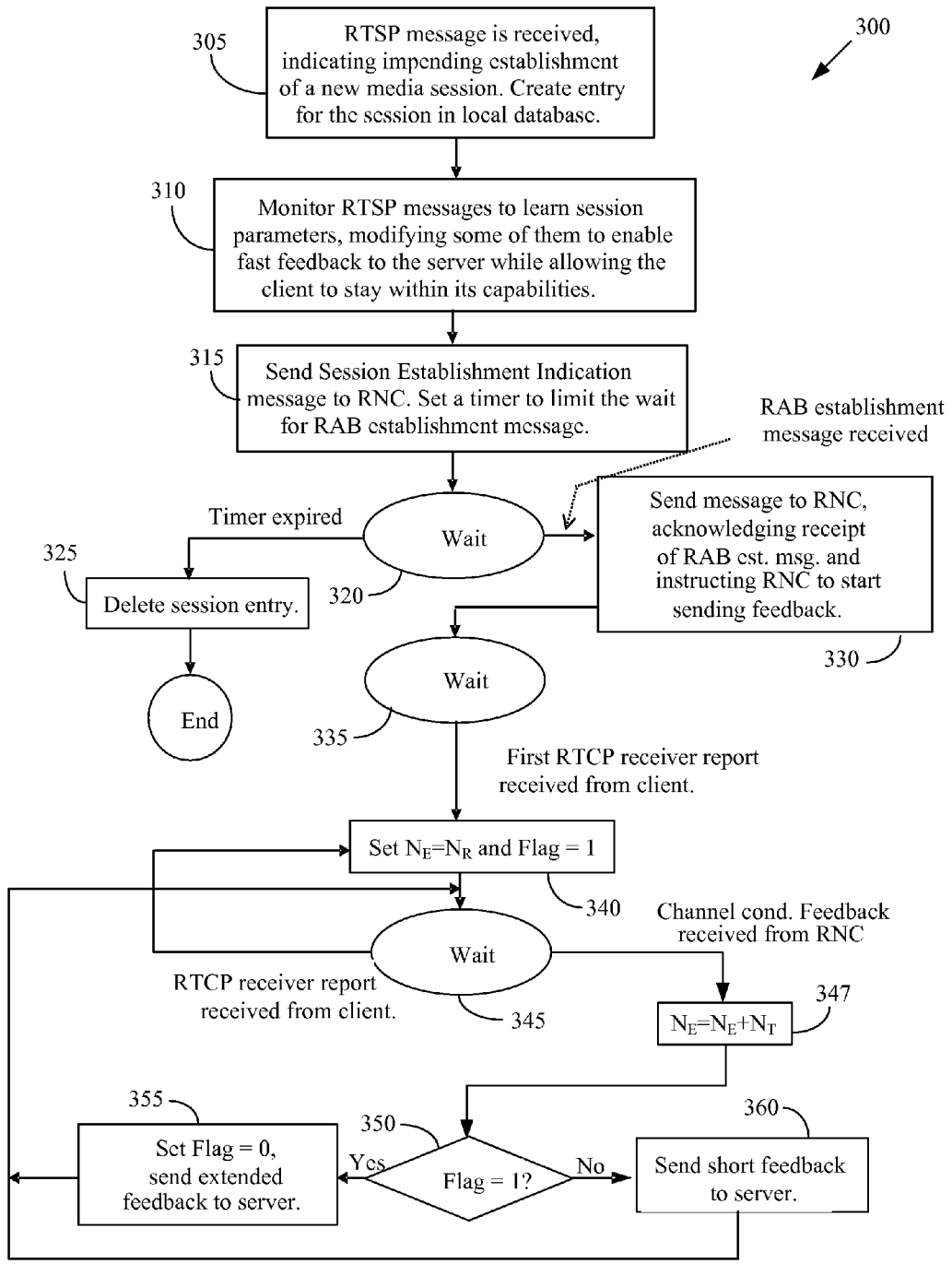
FIG. 3 conceptually illustrates one exemplary embodiment of a method for providing feedback during media streaming over a wireless network, in accordance with the present invention.

FIG. 3 conceptually illustrates one exemplary embodiment of a method 300 for providing feedback during media streaming over a wireless network. As discussed above, a GGSN forwards all RTSP and RTCP messages that it receives from the media server and the client to the signaling proxy. The signaling proxy receives (at 305) these messages and, if the messages indicate impending establishment of a new media session, creates an entry for the new media session in a local database. The signaling proxy may then monitor (at 310) the RTSP messages that are involved in the session's capability exchange phase to learn about session parameters (e.g. client buffer size, time interval at which a client report is sent, etc). When the signaling proxy learns that a media session is about to be established, it sends (at 315) a session establishment indication message to the RNC through which the corresponding media stream is to be delivered. The signaling proxy sets (at 315) a timer after sending this message to the RNC and waits (at 320) for a RAB establishment message (from the RNC) for that media session. If no RAB establishment message is received for the session before the timer expires, the signaling proxy deletes (at 325) the entry for the session from its local database.

If a RAB establishment message for the session is received before the timer expires, the signaling proxy turns off the timer and sends (at 330) a message to the RNC which acknowledges receipt of the RAB establishment message and instructs the RNC to start sending channel/network condition feedback for the corresponding session. This message may contain, among other things, the parameters to be included in the channel/network condition feedback and the interval ($T_P$) at which the feedback is to be provided. After sending this message, the proxy expects to receive a channel/network condition feedback message from the RNC every $T_P$ seconds and an RTCP message (with a receiver report) from the client device every $T_R$ seconds. The proxy therefore waits (at 335) until it receives the first RTCP message with a receiver report from the client. Until the first such report is received, it ignores the channel/network condition feedback messages (for the media session) it may receive from the corresponding RNC.

After receiving the first RTCP message with a receiver report, the signaling proxy may carry out the following actions whenever it receives a channel/network condition feedback message for the media session from the corresponding RNC: The signaling proxy maintains an estimate of the highest RTP sequence number delivered to the client, denoted hereafter by $N_E$. When the proxy receives an RTCP message with a receiver report, it sets (at 340) the estimate, $N_E$, equal to $N_R$, the highest RTP sequence number received by the client as given in its receiver report. The proxy also sets (at 340) a flag to 1 and then waits (at 345) for receiver reports. When a channel/network condition feedback message for the media session is received, the proxy sets (at 347) the new value of $N_E$ equal to the sum of the existing value of $N_E$ and $N_T$, where $N_T$ is the total packet delivery count for the preceding channel condition feedback interval as reported in the just-received channel condition feedback message. The signaling proxy then examines (at 350) the value of the flag.

If the signaling proxy determines (at 350) that the flag has been set to 1, the proxy resets (at 355) the flag (i.e., sets it equal to 0), and sends an extended feedback report to the media server in an RTCP packet. The extended feedback report may include the information reported in the RTCP receiver report received from the client, as well as the maximum transmission rate ($W_S$) at which the corresponding media stream can be transmitted, the channel bandwidth available to the media stream ($W_A$), the proxy's estimate of the highest RTP sequence number received by the client ($N_E$) and other optional parameters (if any) reported in the just-received channel/network condition feedback. On the other hand, if the signaling proxy determines (at 350) that the flag equals 0 when the channel/network condition feedback message arrives, the proxy sends (at 360) a short feedback report (also in an RTCP packet), which may include the current values of $W_S$, $W_A$, $N_E$ and other optional parameters (if any) included in the just-received channel/network condition feedback. When the proxy sends an extended feedback report, it may use the RTP timestamp of the most recent RTCP message received from the client as the RTP timestamp of the extended feedback report. In the case of a short report, the proxy may use its local clock-time to generate the RTP timestamp. In one embodiment, the proxy can use the RTP timestamps associated with the RTCP messages received from the client to adjust its clock time to the client's clock time. Note that suitable extensions to the existing RTCP protocol may be developed to enable the transport of the short and extended feedback reports from the proxy.

When the media session is terminated with appropriate RTSP messages from the client or the server, the signaling proxy deletes (at 325) the entry for that session in its local database, stops sending feedback messages to the media server, and instructs the RNC to stop sending channel/network condition feedback messages.

Figure 4:
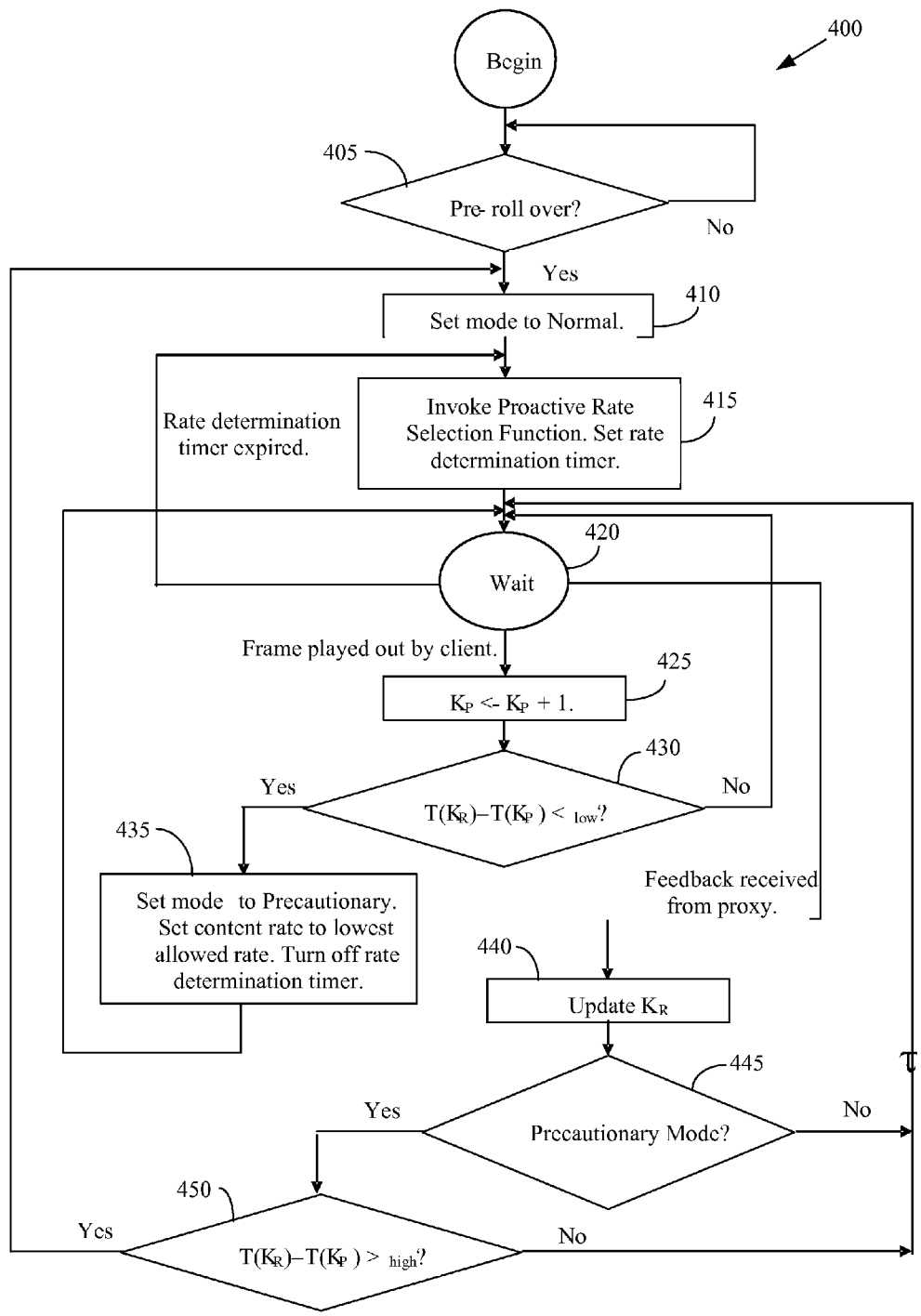
FIG. 4 conceptually illustrates one exemplary embodiment of a method for content rate selection, in accordance with the present invention.

FIG. 4 conceptually illustrates one exemplary embodiment of a method 400 for content rate selection. One of the biggest impairments to streaming video quality is caused by what is commonly known as "rebuffering." Rebuffering occurs when the client buffer content runs out so that it has no frames to decode and play. When this happens, the client freezes frames and waits until a sufficient number of frames accumulate in its buffer before resuming decoding. While proactive rate selection avoids rebuffering to a large extent, it is possible for the client buffer contents to run out, especially during sudden changes in the channel or disruptive events such as handoffs. Embodiments of the method 400 described herein may avoid the rebuffering that is likely to happen if media server continued to stream at the current content rate.

In the illustrated embodiment, the method 400 is implemented in a media server that operates in two modes—normal mode and precautionary mode. In the normal mode, rate change decisions are made every $T_S$ seconds (e.g., every 3-4 seconds). The duration of the rate change interval ($T_S$) is a matter of design choice, which may be determined by a tradeoff between the need to benefit from a benign channel (by streaming at a high content rate) and the need to avoid frequent rate changes that are often found a little irritating by end-users. In the embodiment illustrated herein, as long as the media session is in the normal mode, content rate selection decisions are made every $T_S$ seconds, and the server switches to the selected content rate regardless of whether the selected rate is higher or lower than the current content rate. In an alternative embodiment, which would be more conservative in switching to higher content rates, the wait period for switching to higher content rates could be made longer than that for switching to lower content rates. Such a scheme could, for instance, be implemented as follows: As in the illustrated embodiment, as long as the session is in the normal mode, the server makes content rate selection decisions every $T_S$ seconds. If the selected rate is lower than the current content rate, the server switches to the selected content rate. However, if the selected content rate is higher than the current content rate, the server sets a counter to 1. This counter is incremented after each following content rate selection decision if the selected content rate is greater than or equal to the current content rate. If, during these rate selection procedures, the selected content rate is found to be lower than the current content rate, the server switches to the selected (lower) content rate and resets the counter to 0. When the counter reaches N (e.g., 3), the server switches to the latest selected content rate and resets the counter to 0. This conservative method ensures that there is a wait period of at least $NT_S$ seconds before each shift to a higher content rate. On the other hand, shifts to lower content rates could happen every $T_S$ seconds in the normal mode.

The illustrated method begins with a pre-roll period (at 405) that is used to build up frames in a buffer at the client. At the end of the pre-roll period (at 405), when, in the estimate of the media server, the client begins to play out frames, the media server sets (at 410) the mode to "normal," and sets (at 415) a timer (referred to hereinafter as the rate determination timer) to expire after $T_S$ seconds. The media server may then wait (at 420) until the rate determination timer expires. When the timer expires (at 420), the media server invokes (at 415) a proactive content rate selection algorithm, described below, to determine the content rate for the next $T_S$ seconds. The variables used by this algorithm may be updated by different modules of the media server as described in the corresponding sections.

In the illustrated embodiment, the media server implements techniques for entering a precautionary mode to reduce the likelihood of a buffer underflow. The media server maintains presentation timestamps that indicate the media server's estimates of the latest frame played out by the client and the latest frame delivered to the client. Let $K_R$ and $K_P$ respectively denote the media server's estimates of the latest frame (i.e., one with the highest presentation timestamp) delivered to the client (receiver) and the most recent frame played out by the client. In the illustrated embodiment, these estimates are indicated by numeric identifiers or sequence numbers such as $K_R$ and $K_P$. However, in alternative embodiments, frames may be identified by their presentation timestamps. Frames arranged according to their presentation timestamps follow a natural numbering scheme. Whenever, in the media server's estimate, a frame is played out by the client, it increments (at 425) $K_P$ by 1; i.e., moves the timestamp associated with the latest frame played out by the client to the next frame's timestamp. Whenever the server receives a feedback message from the proxy, it updates (at 425) $K_R$ using the information it has stored in its cache about the transmitted frames. First, the media server finds the frame with the highest RTP sequence number less than or equal to the feedback variable $N_E$ reported in the message. (Recall that $N_E$ represents the signaling proxy's estimate of the highest RTP sequence number delivered to the client.) The media server then sets $K_R$ equal to the identifier of this frame.

Now, whenever, in the media server's estimate, a frame is played out by the client so that $K_P$ is incremented (at 425), the server calculates (at 430) the difference ($T(K_R)-T(K_P)$) where $T(K_R)$ and $T(K_P)$ are the presentation timestamps associated with frames $K_R$ and $K_P$, respectively. If this difference is found (at 430) to be less than a threshold $\tau_{low}$ (e.g. 0.5 seconds), the server enters (at 435) the precautionary mode. When this happens, the rate determination timer is turned off (at 435), and the content rate is set (at 435) to the lowest rate allowed for the media session ($C_1$ in the present example), where it stays until the server returns to the normal mode.

In the precautionary mode (at 445), the server continues to update (at 440) $K_R$ and $K_P$ as described above. On updating (at 440) $K_R$ (which would happen whenever a feedback message is received from the signaling proxy), the server computes (at 450) the difference $(T(K_R)-T(K_P))$, and compares (at 450) it with another threshold $\tau_{high}$ (e.g., 2 seconds). If $(T(K_R)-T(K_P))$ is greater than this threshold, the server returns (at 410) to the normal mode. At this point, the server invokes (at 415) the proactive content rate selection algorithm to determine the content rate for the subsequent frames and sets (at 415) the rate determination timer to expire after $T_S$ seconds (whereupon the next content rate selection is expected to take place.) Note that the threshold $\tau_{high}$ merely represents a condition where the client buffer has an adequate number of frames to counter normal fluctuations in the channel rate. It should not be confused with buffer levels which represent imminent buffer overflow.

As mentioned earlier, if the media server is not in a precautionary mode, it may perform content rate selection every $T_S$ seconds (e.g., every 3-4 seconds). Once a content rate has been selected, the server may continue to output frames at this content rate for the next $T_S$ seconds unless it enters the precautionary mode. The normal (i.e. when not in a precautionary mode) rate selection is done to attempt to maximize media quality while keeping the probability of a rebuffering event happening in the next planning horizon (of duration H seconds) within a threshold β (e.g. 0.001 or 0.1%). For each possible content rate, $C_1, \ldots, C_N$, an estimate of the probability of a rebuffering event happening in the next H seconds may be computed as follows.

Content rate selection may be performed using a statistical representation of the bandwidth available for transmitting frames to the mobile client. The statistical representation of the bandwidth may be used to determine a statistical estimate of a likelihood or probability that a re-buffering event may occur if packets or frames are transmitted at each potential content rate. Let $N_H$ denote the smallest integer greater than or equal to $(H/T_F)$ where $T_F$ is the frame interval. Thus, when the media server estimates the probability of a rebuffering event happening over the next H seconds, the media server evaluates the probability of rebuffering over the next $N_H$ frame periods. The probability that no rebuffering takes place over the next $N_H$ frame periods may be as approximated by the probability that the $(N_H)^{th}$ frame (counting after the most recently played out frame) is available at the receiver when the corresponding play-out instant occurs. This, in turn, is equivalent to requiring that the aggregate capacity and/or bandwidth of the channel over $N_H$ frame periods is sufficient to carry the aggregate payload associated with the frames (up to the $N_H^{th}$ frame) that are yet to be delivered to the receiver.

As in the previous section, let $K_R$ and $K_P$ respectively denote the media server's estimates of the latest frame (i.e., one with the highest presentation timestamp) delivered to the client (receiver) and the most recent frame played out by the client. Thus, the frame at the end of the planning horizon (referred to in the preceding paragraph as $(N_H)^{th}$ frame counting after the just played out frame) would be $(K_P+N_H)$. Therefore, in order for this frame to be delivered to the client before its play-out time, the aggregate capacity and/or bandwidth of the channel over the next $N_H$ frame periods will have to be greater than or equal to the payload associated with the frames numbered $(K_R+1)$ through $(K_P+N_H)$.

The media server determines and keeps track of the channel bandwidth parameters, B and $\sigma_B$, where B is the estimate of the mean channel bandwidth (available to the media session) over a channel condition feedback interval ($T_F$ seconds) and $\sigma_B$ is the estimate of the corresponding standard deviation. Let J be the largest integer less than or equal to $(H/T_F)$. Then, the channel capacity available to the media session over the next $N_H$ frame periods could be written as:

$$R=R_1+R_2+\ldots+R_J,$$

where for i=1, 2, . . . , J, $R_i$ represents the channel bandwidth (available to the media session) over the $i^{th}$ channel condition feedback interval beginning from the present time, and R is the aggregate channel capacity and/or bandwidth over the planning horizon of duration H seconds. Assuming that the current estimate of channel bandwidth (over a channel condition feedback interval) parameters will continue to be valid for the planning horizon, a reasonable estimate of the aggregate channel capacity over the planning horizon would be ρ where ρ is given by:

$$\rho \sim N(JB, J^{0.5}\sigma_B),$$

where N (x, y) denotes a Normal (Gaussian) random variable with mean x and standard deviation y. That is, we approximate the aggregate channel capacity over the planning horizon by a Gaussian random variable with mean (J B) and standard deviation ($J^{0.5}\sigma_B$).

Now consider the payload associated with the frames ($K_R$+1) through ($K_P+N_H$), which are yet to be delivered to the receiver. Let $K_T$ denote the latest frame transmitted out by the server. That is, in the server's estimate, frames ($K_R$+1) through $K_T$ have been transmitted but are yet to be delivered to the receiver. Recall that the server keeps track of the cumulative payload associated with each frame that has been transmitted. The cumulative payload associated with a frame is the sum of the payloads (inclusive of protocol overheads) of all frames transmitted out by the server up to that frame. Let D(n) denote the cumulative payload associated with frame n (where the argument n can take values 1, 2, . . . ). Then the aggregate payload associated with frames ($K_R$+1) through $K_T$ is equal to $[D(K_T)-D(K_R)]$. Frames ($K_T$+1) through ($K_P+N_H$) are yet to be transmitted so that their associated payloads are not known to the server. Consequently, the server calculates an estimate of this component of the payload. Since the server keeps track of the mean frame size (F) and the standard deviation of the frame size ($\sigma_F$) at the highest content rate ($C_N$), these parameters can be used to obtain an estimate of the payload associated with these frames. Specifically, if frames ($K_T$+1) through ($K_P+N_H$) were encoded at the highest content rate ($C_N$), the aggregate size of the payload associated with them could be represented by a Gaussian random variable with mean $[(K_P+N_H-K_T)F]$ and standard deviation $[(K_P+N_H-K_T)^{0.5}\sigma_F]$.

The server can now derive estimates of the total payload to be delivered over the next $N_H$ frame periods if it were to encode frames ($K_T$+1) through ($K_P+N_H$) at the different content rates available to it. Specifically, for i=1, 2, . . . , N, $\phi_i$, the payload size for the ($K_P+N_H-K_R$) frames to be delivered if the i-th content rate is selected, is given by $$\phi_i \sim N(D(K_T)-D(K_R)+(K_P+N_H-K_T)F\ C_i/C_N, (K_P+N_H-K_T)^{0.5}\sigma_F C_i/C_N),$$

where the known payload associated with frames ($K_R$+1) through $K_T$ contributes to the mean, but not to the standard deviation. It follows then that, for i=1, 2, . . . , N, $P^{(i)}$, the probability of a rebuffering event happening during the next planning horizon if the server selects the $i^{th}$ content rate, can be approximated by:

$$P^{(i)}=Pr\{\text{Rebuffering}|\text{Content rate } i \text{ is selected}\}=Pr\{\phi_i>\rho\}=Pr\{\phi_i-\rho>0\}.$$

Given that $\phi_i$ and ρ are independent Gaussian random variables, the difference ($\phi_i-\rho$), too, is Gaussian with mean $(D(K_T)-D(K_R)+(K_P+N_H-K_T)F\ C_i/C_N-JB)$, and standard deviation $\{((K_P+N_H-K_T)\sigma_F C_i/C_N)^2+J\sigma_B^2\}^{0.5}$. As a consequence, the probability, $P^{(i)}$, can be written as $$P^{(i)}=Q([JB-\{D(K_T)-D(K_R)+(K_P+N_H-K_T)F\,C_i/C_N\}]/[\{(K_P+N_H-K_T)\sigma_F C_i/C_N\}^2+J\sigma_B^2]^{0.5}),$$

where the function $Q(\alpha)$ denotes the tail probability for a Gaussian density function:

$$Q(\alpha) = (2\pi)^{-0.5}\int_{\alpha}^{\infty}\exp(-x^2)dx$$

In order to maximize media quality, the server may select the highest content rate, $C_{Imax}$, for which $P^{(Imax)}$, the probability of rebuffering calculated as shown above, is less than or equal to an acceptance threshold $\beta$. That is, $$\begin{aligned}I\max &= \text{Max }\{i|P^{(i)}\text{ is less than or equal to }\beta\}\\&= \text{Max }\{i|Q([JB-\{D(K_T)-D(K_R)+(K_P+N_H-\\&\quad K_T)F\,C_i/C_N\}]/\\&\quad [\{(K_P+N_H-K_T)\sigma_F C_i/C_N\}^2+J\sigma_B^2]^{0.5}) < \tau_\beta\}.\end{aligned}$$

Since the function, $Q(\alpha)$, is a monotonically decreasing function of $\alpha$, comparing $Q(\alpha)$ to $\beta$ is equivalent to comparing the argument $\alpha$ to the threshold $\tau_\beta$, where the relationship between $\beta$ and $\tau_\beta$ is given by $$\beta = Q(\tau_\beta) = (2\pi)^{-0.5}\int_{\tau_\beta}^{\infty}\exp(-x^2)dx$$

For instance, if 62 is 0.1%, $\tau_\beta$ is close to 3.1. Thus, given $\tau_\beta$ (which is equivalent to assuming some value of $\beta$), content rate selection criterion can be written as:

$$I\max = \text{Max }\{i|[JB-\{D(K_T)-D(K_R)+(K_P+N_H-K_T)F\,C_i/C_N\}]/[\{(K_P+N_H-K_T)\sigma_F C_i/C_N\}^2+J\sigma_B^2]^{0.5}>\tau_\beta\},$$

or $$I\max = \text{Max }\{i|JB>\{D(K_T)-D(K_R)+(K_P+N_H-K_T)F\,C_i/C_N\}\text{ and }[JB-\{D(K_T)-(K_R)+(K_P+N_H-K_T)F\,C_i/C_N\}]^2>[\{(K_P+N_H-K_T)\sigma_F C_i/C_N\}^2+J\sigma_B^2]\tau_\beta^2\}.$$

In other words, the media server simply selects the highest content rate for which the quantity, $[J\,B-\{D(K_T)-D(K_R)+(K_P+N_H-K_T)F\,C_i/C_N\}]$, is positive and its square is greater than or equal to the quantity, $[\{(K_P+N_H-K_T)\cdot\sigma_F C_i/C_N\}^2+J\sigma_B^2]\tau_\beta^2$. If none of the content rates meet this condition, the server simply selects the lowest content rate, $C_1$.

Figure 5:
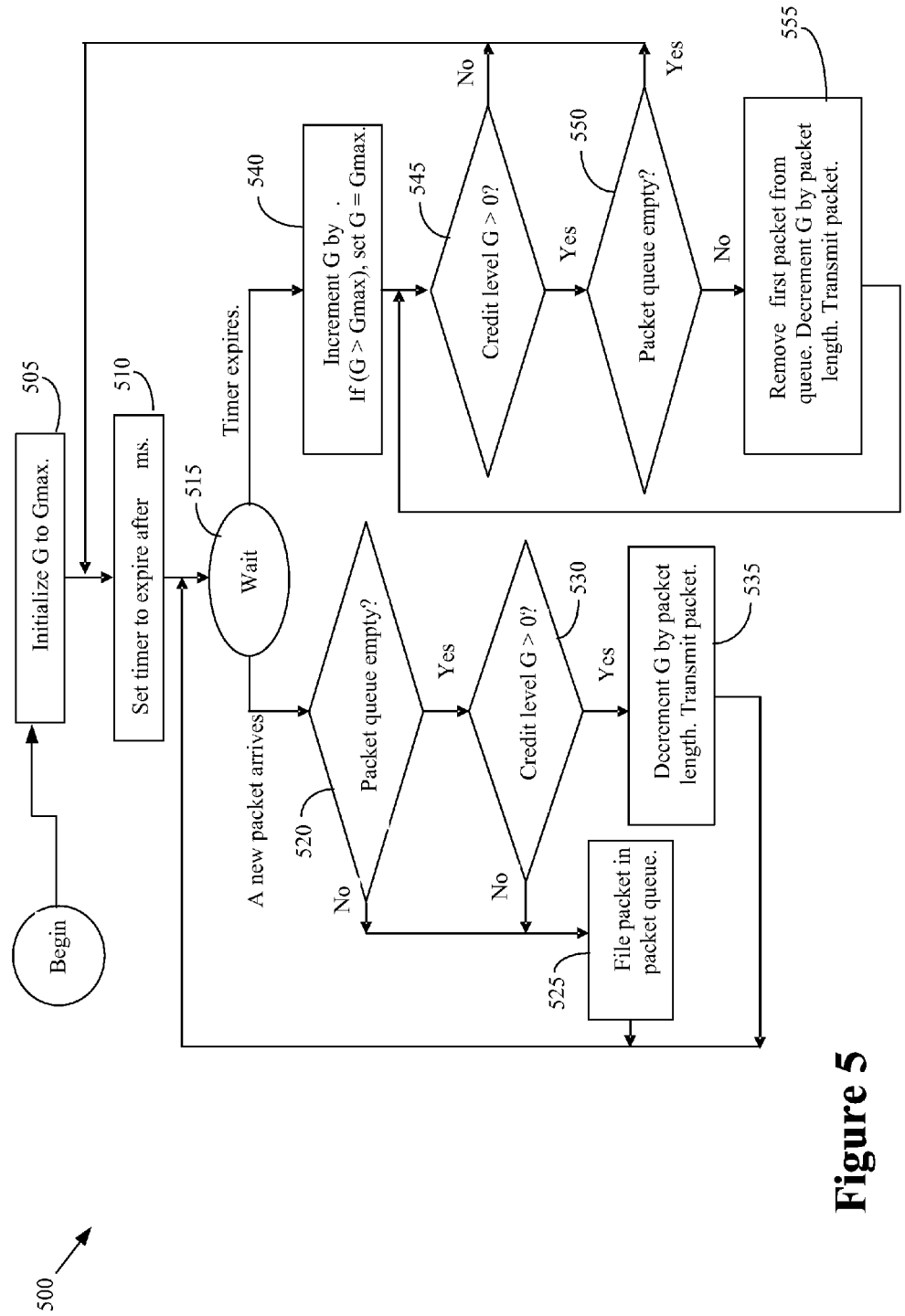
FIG. 5 conceptually illustrates one exemplary embodiment of a method for transmission rate control, in accordance with the present invention.

FIG. 5 conceptually illustrates one exemplary embodiment of a method 500 for transmission rate control. In typical media servers supporting existing streaming media services, the server uses the (rather infrequent) feedback received from the client device to estimate the transmission rate that can be supported by the channel. The well-known TCP-Friendly-Rate-Control (TFRC) algorithm is often employed for this rate estimation based on end-to-end performance metrics provided by the client device. This rate estimation is rather slow (because of the low frequency of feedback from the client) and liable to be inaccurate. In contrast, method 500 uses maximum transmission rate feedback provided by a proxy server (such as described herein) to regulate the rate at which a media server may transmit media frames to a client device. In the illustrated embodiment, a token bucket implementation is used to schedule the transmission rate. However, persons of ordinary skill in the art having benefit of the present disclosure should appreciate that other scheduling techniques may be used to schedule the transmission rate based upon the maximum transmission rate feedback provided by the proxy server.

A token bucket may be characterized by three parameters: a step-size $\Delta$, an update interval $\tau$ and a maximum credit level, Gmax. The media server may also maintain a state variable G, which is referred to as the current credit level, and a packet queue. The maximum credit level is initialized (at 505) and a timer is set (at 510). The media server may then wait (at 515) until a new packet arrives or the timer expires. When the media server has a packet ready for transmission, it is passed to the token bucket. If the media server determines (at 520) that the packet queue (associated with the token bucket) is not empty, the new packet is placed (at 525) at the end of the packet queue where it awaits its turn to be removed from the queue and transmitted out. If the media server determines (at 520) that the queue is empty, the current credit level G is checked (at 530). If G is positive, it is decremented (at 535) by the length of the packet (measured in appropriate units such as bits or bytes), and the packet is transmitted out (i.e., handed to the IP layer for transmission to the client). If G is less than or equal to 0, the packet is simply placed (at 525) at the end of the packet queue where it waits to be picked up.

If the timer expires (at 515), then the credit level G may be incremented (at 540). In the illustrated embodiment, the credit level G is incremented (at 540) every $\tau$ time units (e.g. every 20 ms) as follows:

$$G \leftarrow G+\Delta,\text{ if }(G>\text{Gmax})G\leftarrow \text{Gmax},$$

where $\Delta$ is the step size. After incrementing G, the server checks (at 545) if the credit level G is greater than 0. If G is greater than 0, the server looks (at 550) into the packet queue. If there are packets waiting there, the server removes (at 555) the first packet in the queue, decrements (at 555) the credit level G by the length of the packet and hands the packet to the IP layer for transmission (at 555) to the client. The server keeps repeating these actions as long as it finds (at 545) that the credit level G is greater than 0 and there are packets waiting in the packet queue. If the packet queue is empty or the credit level G is 0 or less, the server sets (at 510) the token bucket timer to expire after $\tau$ time units, and goes back to the wait state (at 515).

The ratio, $\Delta/\tau$, determines the maximum rate at which packets can be transmitted by the media server. For instance, if $\Delta$ is 1000 bits and $\tau$ is 20 ms, the maximum transmission rate is 50 kbps. In the embodiment of the present invention being described here, the media server initializes $\Delta$ to the value $W_0\tau$ where $W_0$ is the transmission rate for the session negotiated with the client during session setup. However, as the server starts streaming media packets and gets feedback messages from the signaling proxy, it changes the value of $\Delta$ to $W_S\tau$ where $W_S$ is the maximum transmission rate parameter included in the feedback message received from the proxy. Since these messages are received every $T_P$ time units, the token bucket parameter $\Delta$ gets updated every $T_P$ time units in accordance with the signaling proxy's latest estimate of the maximum rate at which the session should be allowed to stream.

The media server may also perform frame transmission scheduling. The major objective of frame transmission scheduling is to ensure that the client device has the appropriate frames ready for decoding and play-out before their respective play-out times. The buffer space provided by the client for the media session allows the media server to transmit frames well ahead of their play-out times so that they can be buffered up at the client and be ready when they are needed. This buffer space helps the client overcome fluctuations in the channel bandwidth available to the media session. There are two constraints that may limit how far ahead of their respective play-out times frames can be transmitted by the media server. These constraints are the finite size of the client buffer (which the server becomes aware of during session setup) and the restriction on the transmission rate placed by the token-bucket-based transmission rate control. Thus, the frame transmission scheduling may be carried out within the transmission rate limits imposed by the rate control and may be done in such a manner that there are no packet losses due to buffer overflow at the client device.

In one embodiment, which may help avoid packet losses due to client buffer overflow, the media server assumes that the packets transmitted by the server that do not belong to the frames that have already been played out are in the client buffer and to do frame transmission scheduling in such a manner that the buffer space needed to hold these packets does not exceed the buffer space allocated to the media session. Note that some of these packets could be in transit; i.e., they are yet to be delivered to the client. Thus, the buffer space occupancy due to packets belonging to the media stream being considered is overestimated by assuming that all of these packets are in the client buffer. In the illustrated embodiment, the media server implements a first embodiment of a frame transmission scheduling algorithm during pre-roll and a second embodiment of a frame transmission scheduling algorithm following the pre-roll.

Figure 6:
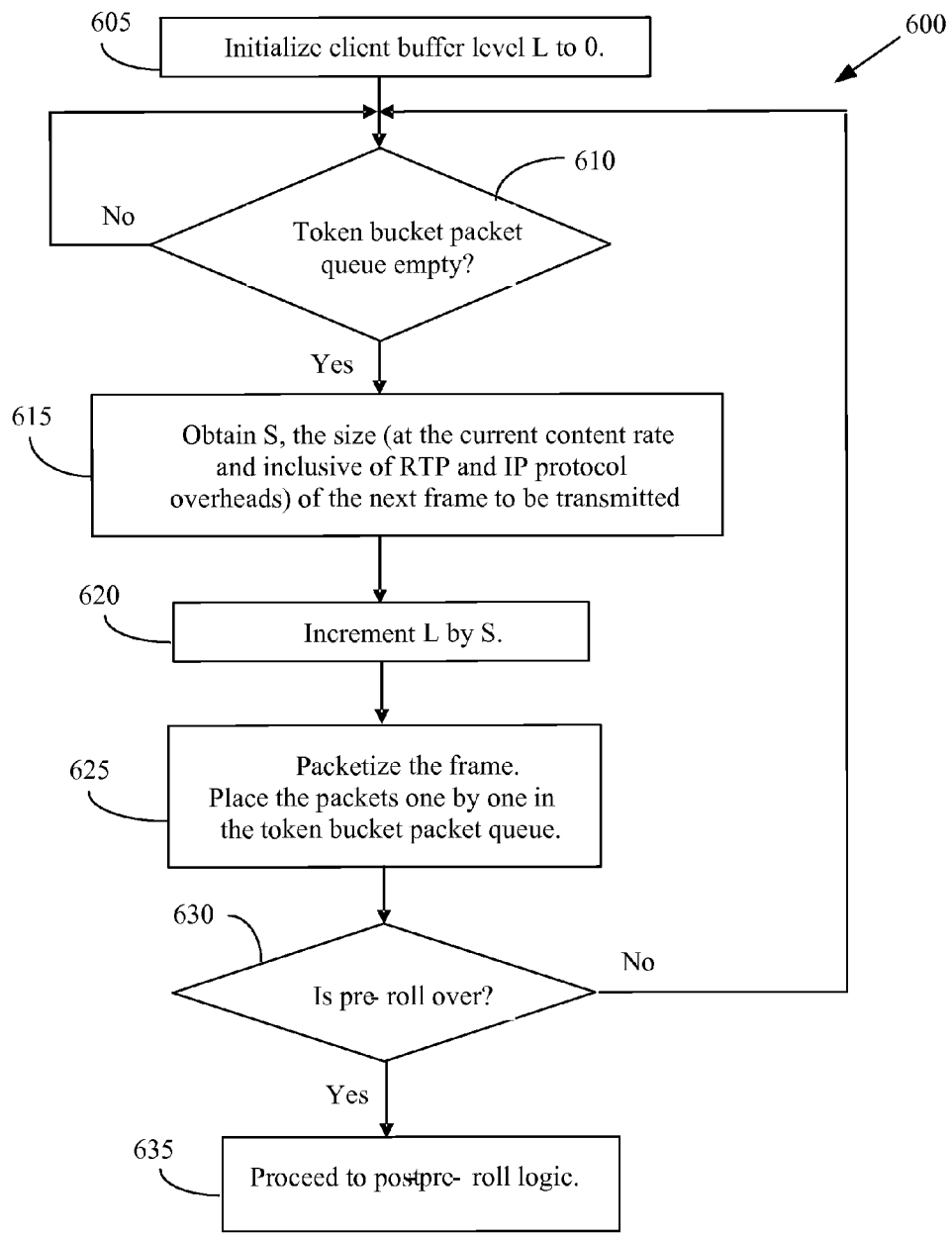
FIG. 6 conceptually illustrates one exemplary embodiment of a method for transmission scheduling during pre-roll, in accordance with the present invention.

FIG. 6 conceptually illustrates one exemplary embodiment of a method 600 for transmission scheduling during pre-roll. In the illustrated embodiment, the media server attempts to transmit frames continuously subject to the limit imposed by the token-bucket-based transmission control. That is, it keeps pushing frames out whenever it senses the packet queue associated with the token-bucket base transmission rate control is empty. Thus, packets belonging to the media stream are continuously transmitted at the rate determined by transmission rate control. The variable L represents the server's estimate of the client buffer level (i.e., byte-count). Note that during the pre-roll period frame transmission scheduling does not have to check its estimate of the client buffer level with the size of the buffer allocated to the media session. This is because the pre-roll period negotiated with the client ensures that there will be adequate buffer space at the client to store all the packets associated with frames belonging to the pre-roll period.

In the illustrated embodiment, the media server initializes (at 605) the client buffer level to zero. The media server then checks (at 610) whether the token bucket packet queue is empty. If the token bucket packet queue is not empty, then the media server may wait until the token bucket packet queue empties. Once the media server determines (at 610) that the token bucket packet queue is empty, then the media server may obtain (at 615) the size of the next frame to be transmitted. In one embodiment, the size of the next frame to be transmitted may be determined based on the current content rate. Furthermore, the size of the next frame may include overhead associated with the RTP and IP protocols. The media server may then increment (at 620) the client buffer level by the estimated size of the next frame to be transmitted.

The frame may be packetized (at 625) and each of the packets associated with the frame may be placed (at 625) one by one into the token bucket packet queue. Packetization of frames (during the pre-roll as well as the post-pre-roll phase) may be done in such a manner that each RTP packet carrying the media fits into a single IP packet. This may help the signaling proxy estimate the RTP sequence numbers of packets delivered to the client from the IP packet delivery count feedback received from the RNC. The media server may then determine (at 630) whether pre-roll is over. If the pre-roll period is not over, then the media server may continue to monitor (at 610) the token bucket packet queue. However, once the pre-roll period has ended, the media server proceeds (at 635) to the post-pre-roll logic.

Figure 7:
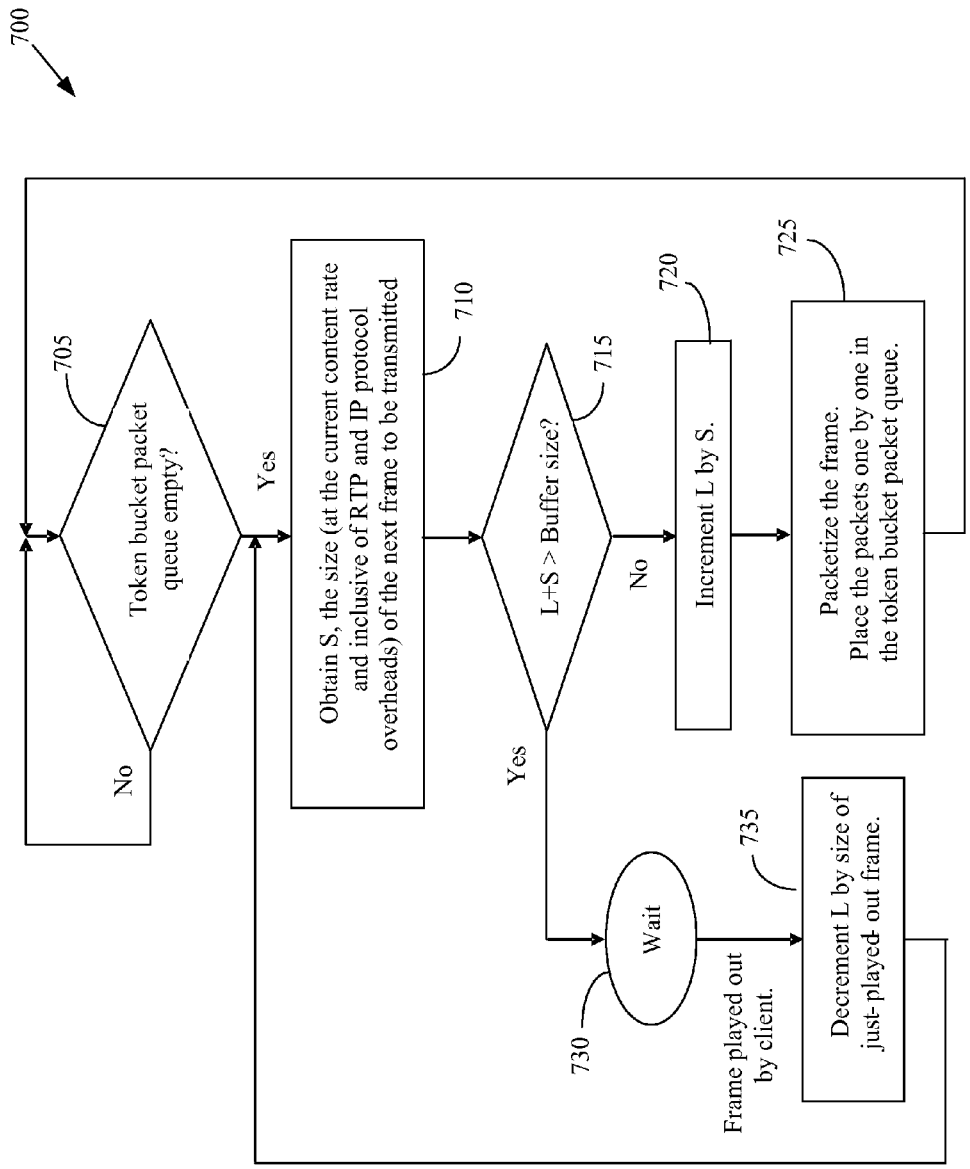
FIG. 7 conceptually illustrates one exemplary embodiment of a method for transmission scheduling after pre-roll, in accordance with the present invention.

FIG. 7 conceptually illustrates one exemplary embodiment of a method 700 for transmission scheduling after pre-roll. Once the pre-roll period is over, the media server has determined that the client has begun playing out frames. Thus, frame transmission scheduling may operate under the dual constraints of working within the rate limit imposed by the token-bucket-based transmission rate control and making sure that its estimate of the client buffer level does not exceeds the buffer size allocated to the media session. When a frame is packetized and the packets are placed in the token bucket packet queue, the frame transmission scheduling function records some information pertaining to that frame. For example, the media server may record the presentation timestamp associated with that frame, the highest RTP timestamp and sequence number associated with a packet belonging to that frame, the byte count associated with that frame (inclusive of RTP, UDP and IP protocol overheads), and the cumulative byte count associated with all the frames up that frame (referred to in the section on proactive content rate selection by the variable D(n)). Note that the last quantity is simply the sum of the cumulative byte count associated with all the frames up to the previous frame (which was recorded when that frame was transmitted) and the byte count associated with the just-transmitted frame. The information associated with a frame may be kept in the memory until the corresponding frame is played out by the client. The information associated with the frame can be erased when, in the server's estimate, the client plays out the frame.

In the illustrated embodiment, the media server checks (at 705) whether the token bucket packet queue is empty. If the token bucket packet queue is not empty, then the media server may wait until the token bucket packet queue empties. Once the media server determines (at 705) that the token bucket packet queue is empty, then the media server may obtain (at 710) the size, S, of the next frame to be transmitted. In one embodiment, the size of the next frame to be transmitted may be determined based on the current content rate. Furthermore, the size of the next frame may include overhead associated with the RTP and IP protocols. The media server may then determine (at 715) whether the sum of the estimated buffer level, L, plus the size of the frame that is to be transmitted, S, is larger than the client buffer size. If the sum of the estimated buffer level, L, plus the size of the frame that is to be transmitted, S, is not larger than the client buffer size, then the media server may increment (at 720) the estimated buffer level by the size of the frame that is to be transmitted. The frame may be packetized (at 725) and each of the packets associated with the frame may be placed (at 725) one by one into the token bucket packet queue.

If the sum of the estimated buffer level, L, plus the size of the frame that is to be transmitted, S, is larger than the client buffer size, then the media server may wait (at 730) for a frame to be played out by the client, thereby reducing occupancy of the client buffer. The media server may then decrement (at 735) the estimated buffer level by the size of the frame that was just played out. The media server may obtain (at 710) the size, S, of the next frame to be transmitted and determine (at 715) whether the sum of the estimated buffer level, L, plus the size of the frame that is to be transmitted, S, is larger than the client buffer size.

As seen earlier (in the section on proactive content rate selection), the media server maintains an estimate of the mean, mean-square and standard deviation of the frame sizes at the highest content rate. These variables are initialized to suitable values (based on the server's knowledge of the media), and updated whenever a frame is transmitted (i.e., the frame is packetized and the packets placed in the token-bucket packet queue. For example, let F, $S_F$, and $\sigma_F$ denote the server's estimates of the mean frame size, the mean-square frame size and the standard deviation of frame size at the highest content rate, respectively. Let Z and C denote the size of a just-transmitted frame inclusive of RTP, UDP and IP protocol overheads and the content rate at which it was encoded, respectively. Then the parameters F, $S_F$, and $\sigma_F$ may be updated as follows:

$$F \leftarrow a_F Z(C_N/C) + (1-a_F)F,$$

and $$S_F \leftarrow a_F Z^2 (C_N/C)^2 + (1-a_F) S_F,$$

Where $C_N$ is the highest content rate for the media session and $\sigma_F$ is a suitable filtering constant (e.g., 0.05). After updating the estimates of the mean frame-size (F) and the mean square frame-size ($S_F$) at the highest content rate, the media server updates $\sigma_F$, its estimate of the standard deviation of frame-size at the highest content rate, as follows:

If $(S_F > F^2)$ $$\sigma_F = (S_F - F^2)^{0.5},$$

Else $$\sigma_F = 0.$$

In some embodiments, the media server may also perform one or more subsidiary functions, such as handling feedback messages and maintaining state variables. Recall that the media server may receive two types of feedback messages from the proxy—short messages and extended messages. A short message includes the signaling proxy's estimates of the highest RTP sequence number received by the client (referred to as $N_E$ in the description of content rate selection), the channel bandwidth available to the media session ($W_A$) and the maximum transmission rate at which the media server can transmit packets toward the client ($W_S$). An extended feedback message may include these items as well as other information reported by the client in its RTCP feedback message. The latter items may include the highest RTP sequence number received, fraction of RTP packets lost, RTP sequence number of the next application data unit to be decoded, and so on. In addition, each feedback message may carry an RTP timestamp. For a short feedback message, this timestamp indicates the time at which the message originated at the proxy. For an extended feedback message, the RTP timestamp indicates the time at which the client sent the RTCP feedback message whose contents were copied into the extended feedback message sent by the proxy.

The server may take the following actions when it receives a feedback message. If it is a short feedback message, the server sets $N_E$, its estimate of the highest RTP sequence number received by the client, equal to the value of the corresponding variable received in the message, sets $\Delta$, the step size used by the token-bucket based transmission rate control, equal to $\tau W_S$ where $W_S$ is the maximum transmission rate reported in the feedback message, and, using the available channel bandwidth reported in the message, updates channel bandwidth parameters. In one embodiment, the media server maintains three parameters related to the available channel bandwidth. These are B, $S_B$ and $\sigma_B$, which respectively represent the server's estimates of the mean, the mean-square and the standard deviation of the channel bandwidth available to the media session. When the server receives a short feedback message, these parameters are updated using the following equations:

$$B \leftarrow a_B W_A + (1-a_B)B,$$

and $$S_B \leftarrow a_B (W_A)^2 + (1-a_B) S_B,$$

where $W_A$ is the available channel bandwidth reported in the just-received feedback message and $a_B$ is a suitable filtering constant (e.g., 0.1).

After updating the estimates of the mean channel bandwidth (B) and the mean square channel bandwidth ($S_B$), the media server updates $\sigma_B$, its estimate of the standard deviation of channel bandwidth, as follows:

If $(S_B > B^2)$ $$\sigma_B = (S_B - B^2)^{0.5},$$

Else $$\sigma_B = 0.$$

After setting, $N_E$, its estimate of the highest RTP sequence number received by the client, the server updates $T(K_R)$, the presentation timestamp associated with the latest frame received by the client. This is done simply by looking up the frame data recorded in its local database by the frame transmission scheduling function. The frame with the highest RTP sequence number less than or equal to $N_E$ is the desired frame ($K_R$) and its presentation timestamp is the desired presentation timestamp $T(K_R)$. After updating $T(K_R)$, the media server checks if the precautionary mode is on. If it is, it checks if $T(K_R) - T(K_P)$ is greater than $\tau_{high}$, and goes back to the normal mode if that condition is satisfied (as described earlier).

When an extended message is received, the server may carry out all of the actions that it takes on receiving a short message, as well as some additional functions. In one embodiment, using the parameters such as the RTP timestamp of the feedback message, the RTP timestamp associated with the last sender's report received by the client, the time since receiving the last sender's report, the media server may update its estimates of the round-trip time and adjusts its estimate of the client's clock-time. Using the RTP sequence number associated with the next application data unit to be decoded, the server may determine the presentation timestamp associated with the last frame played out by the client. This frame would have the highest RTP sequence number (stored in a local database as described in the section on frame transmission scheduling) strictly less than the RTP timestamp associated with the next application data unit to be decoded. The corresponding presentation timestamp would give the desired presentation timestamp (denoted by $T(K_P)$). The delay until the decoding of the next application data unit is used to correct small errors in the estimates of the playout times of the frames being delivered to the client.

Embodiments of the techniques described herein may provide a number of advantages over conventional practice. For example, media servers may perform content rate control by estimating buffer levels at the mobile client using statistical representations of available bandwidth, which may be determined using feedback from a proxy server. Since the feedback is timely and based on direct knowledge of the channel conditions, the media server may be able to predict potential packet losses and/or rebuffering events. Consequently, the media server can pro-actively perform content rate selection, which may help avoid packet losses and/or prevent rebuffering events that are detrimental to the quality of the streaming media service.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

What is claimed:

1. A method, comprising:
   selecting, at a media server, a content rate for play out of at least one frame transmitted from the media server to a media client via a wireless access network, wherein:
   when the media server is operating in a first mode, selection of the content rate comprises selecting one of a plurality of available content rates based on a statistical representation of a bandwidth available for transmission of said at least one frame; and
   when the media server is operating in a second mode, selection of the content rate comprises selecting a lowest available content rate from the plurality of available content rates.

2. The method of claim 1, wherein the media server is operated in the first mode upon a determination that (a) a buffer level at the client is above a threshold level or (b) an amount by which a presentation timestamp for a latest frame delivered from the media server to the media client exceeds a presentation time stamp for a most recent frame played by the media client.

3. The method of claim 2, wherein selecting one of the plurality of available content rates comprises determining a plurality of probabilities of buffer underflow at the media client, each of the plurality of probabilities being determined under the assumption that said at least one frame is encoded using a corresponding one of the plurality of available content rates.

4. The method of claim 3, wherein determining the plurality of probabilities of buffer underflow at the media client comprises determining the plurality of probabilities of buffer underflow at the media client based on the statistical representation of the bandwidth available for transmission of said at least one frame.

5. The method of claim 3, wherein determining the plurality of probabilities of buffer underflow at the media client comprises determining a plurality of probabilities of buffer underflow occurring at the media client within a selected time horizon.

6. The method of claim 3, wherein selecting one of the plurality of available content rates comprises selecting one of the plurality of available content rates when the probability of buffer underflow at the media client for the selected one of the plurality of available content rates falls below a threshold.

7. The method of claim 1, comprising determining the statistical representation of the bandwidth available for transmission of said at least one frame.

8. The method of claim 7, wherein determining the statistical representation of the bandwidth comprises determining an aggregate capacity available for transmission of information.

9. The method of claim 8, wherein determining the aggregate capacity comprises determining the aggregate capacity based on a mean channel bandwidth over a channel condition feedback interval and a standard deviation associated with the mean channel bandwidth.

10. The method of claim 7, comprising determining a statistical representation of a payload associated with said at least one frame.

11. The method of claim 10, wherein determining the statistical representation of the payload associated with said at least one frame comprises determining at least one of a mean frame size and a standard deviation of the frame size for at least one content rate.

12. The method of claim 11, wherein determining the statistical representation of the payload associated with said at least one frame comprises estimating a payload associated with said at least one frame based on at least one of the mean frame size and the standard deviation of the frame size for the at least one content rate.

13. The method of claim 1, comprising operating the media server in the second mode when the media server estimates the buffer level at the client is below a first threshold level or when the media server calculates that the difference between the presentation timestamps for the latest frame delivered from the media server to the media client and the most recent frame played by the media client is below a first threshold time.

14. The method of claim 13, comprising transitioning the media server from the second mode to the first mode when the media server estimates the buffer level at the client is above a second threshold level or when the media server calculates that the difference between the presentation timestamps for the latest frame delivered from the media server to the media client and the most recent frame played by the media client is above a second threshold time.

15. The method of claim 14, wherein the first threshold level is smaller than the second threshold level and wherein the first threshold time is shorter than the second threshold time.

16. The method of claim 1, comprising encoding at least one frame based on the selected content rate and transmitting said at least one frame over an air interface.

* * * * *